US006253212B1

United States Patent
Loaiza et al.

(10) Patent No.: US 6,253,212 B1
(45) Date of Patent: Jun. 26, 2001

(54) METHOD AND SYSTEM FOR MAINTAINING CHECKPOINT VALUES

(75) Inventors: Juan R. Loaiza, San Carlos; William H. Bridge, Jr., Alameda, both of CA (US); Ashok Joshi, Nashua, NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/103,627

(22) Filed: Jun. 23, 1998

(51) Int. Cl.[7] .................................................. G06F 17/30
(52) U.S. Cl. ................................ 707/202; 707/8; 714/19
(58) Field of Search ........................ 707/8, 202, 200–201, 707/203–204

(56) References Cited

U.S. PATENT DOCUMENTS

| | | | |
|---|---|---|---|
| 4,819,156 | * 4/1989 | DeLorme et al. | 707/200 |
| 4,868,744 | * 9/1989 | Reinsch et al. | 714/19 |
| 5,864,849 | * 1/1999 | Bohannon et al. | 707/8 |
| 6,004,475 | * 3/2000 | Chung et al. | 714/15 |

FOREIGN PATENT DOCUMENTS

WO 97/00477 * 1/1997 (WO).

OTHER PUBLICATIONS

"Recovery Technique Based on Fuzzy Checkpoint in a Client/Server Database System," Choi et al., Proceedings of COMPSAC, 1996, IEEE (CB35986, pp. 542–547, Aug., 1996.*

"Checkpointing Schemes for fast Restart in Main Memory Database Systems," Lee et al., Proceedings of the 1997 IEEE Conference on Communications, Computers and Signal Processing, IEEE 97CH36060, pp. 663–668, Aug., 1997.*

* cited by examiner

Primary Examiner—Hosain T. Alam
(74) Attorney, Agent, or Firm—Hickman Palermo Truong and Becker LLP; Carl L. Brandt (57) ABSTRACT

A method and system are provided for maintaining a checkpoint value that indicates which records of a plurality of records associated with updates made before a failure have to be processed after the failure. According to one aspect of the invention, an ordered list of buffers is maintained in volatile memory. The ordered list of buffers has a head and a tail. The ordered list of buffers is maintained by writing a record that indicates the update to nonvolatile memory and adding the buffer to the tail of the ordered list whenever an update is made to a data item within a buffer in volatile memory. When a data item contained in a buffer within the ordered list is stored in nonvolatile memory, the buffer can be removed from the ordered list. A checkpoint value that identifies a record associated with a buffer located at the head of the ordered list is written to nonvolatile memory. According to another aspect, after a failure, the record associated with the checkpoint value is identified. If a particular record was stored to nonvolatile memory before the record associated with the checkpoint value, the particular record is not processed. If the particular record was not stored to nonvolatile memory before the record associated with the checkpoint value, the particular record is processed.

75 Claims, 5 Drawing Sheets

METHOD AND SYSTEM FOR MAINTAINING CHECKPOINT VALUES

The present invention relates to computer systems and, more specifically, to a method for increasing the efficiency of recovery operations within database systems.

BACKGROUND OF THE INVENTION

Most data processing systems include both volatile and nonvolatile memory devices. In general, volatile memory devices, such as random access memory, provide faster access times than nonvolatile memory devices, such as magnetic or optical disks. However, nonvolatile memory is generally less expensive and less susceptible to data loss.

To take advantage of the persistent nature of nonvolatile memory, an object, such as a data item in a database system, is typically stored on nonvolatile memory (i.e. database) until the object is required by a process. To take advantage of the speed of volatile memory, a copy of the object is loaded into volatile memory when the object is required by a process. Once the object is loaded into volatile memory, the process can quickly access and make changes to the copy of the object. At some later point in time, the copy of the updated object is written back to the database in order to reflect the changes that were made by the process.

For example, in a database system, a section of volatile memory known as a buffer cache is generally used by the processes for accessing and manipulating information contained within the database. In order for a process to access or change data that is stored in the database, a copy of the data is first loaded from the database into the buffer cache. After the data is loaded in the buffer cache, the process can then quickly access and manipulate the copied data version. At some later point in time, the contents of the buffer cache are written back to the database in order to reflect any changes that were previously made to the copied data version.

Typically, the buffer cache includes multiple buffers that are shared among one or more processes that are executing on a database server. When a process executes a transaction that requires a change to an item within a data block, a copy of the data item is loaded into a buffer in the buffer cache. Any changes are then made to the data within the buffer.

Because of the nature of volatile memory, various types of failures can cause the information contained within the buffers to be lost. If the volatile memory contains updated copies of data items, the changes may be lost if a failure occurs before the changes are written back into the database. In many applications, such loss of information is unacceptable.

Therefore, recovery techniques have been developed to reduce the possible loss of information due to failures within a database system. According to one approach, data is made "recoverable" whenever it becomes critical for the data to survive a failure. Data is considered to be "recoverable" when enough information to reconstruct the data after a failure is stored in nonvolatile memory. For example, in database systems it is considered critical that the changes made by a particular committed transaction be reflected on the database and the changes made by a particular aborted transaction be removed from the database.

Redo Records

One method of making the updated data recoverable is to write redo records into a redo log file in nonvolatile memory. The redo records contain a description of the changes that were made by a particular transaction that will enable a recovery process to reapply the changes in the event of a failure.

Specifically, whenever a transaction executes, space is allocated for redo records in both volatile and nonvolatile memory. The redo records are used to store a description of changes that a transaction makes to a particular buffer in the buffer cache. The description of the changes are stored in the redo records in volatile memory and then later copied into the redo records in nonvolatile memory.

In creating the redo records, a version identifier is associated with each redo record. The version identifier indicates the version of a particular data item associated with the update information contained in a redo record. After the redo record is copied into the redo log file, the version identifier is used in determining whether the data item in the database reflects the changes recorded in the redo record. In addition to the version identifier, each redo record in nonvolatile memory is associated with a byte offset that indicates where the particular redo record is located within the redo log file.

Figure 1:
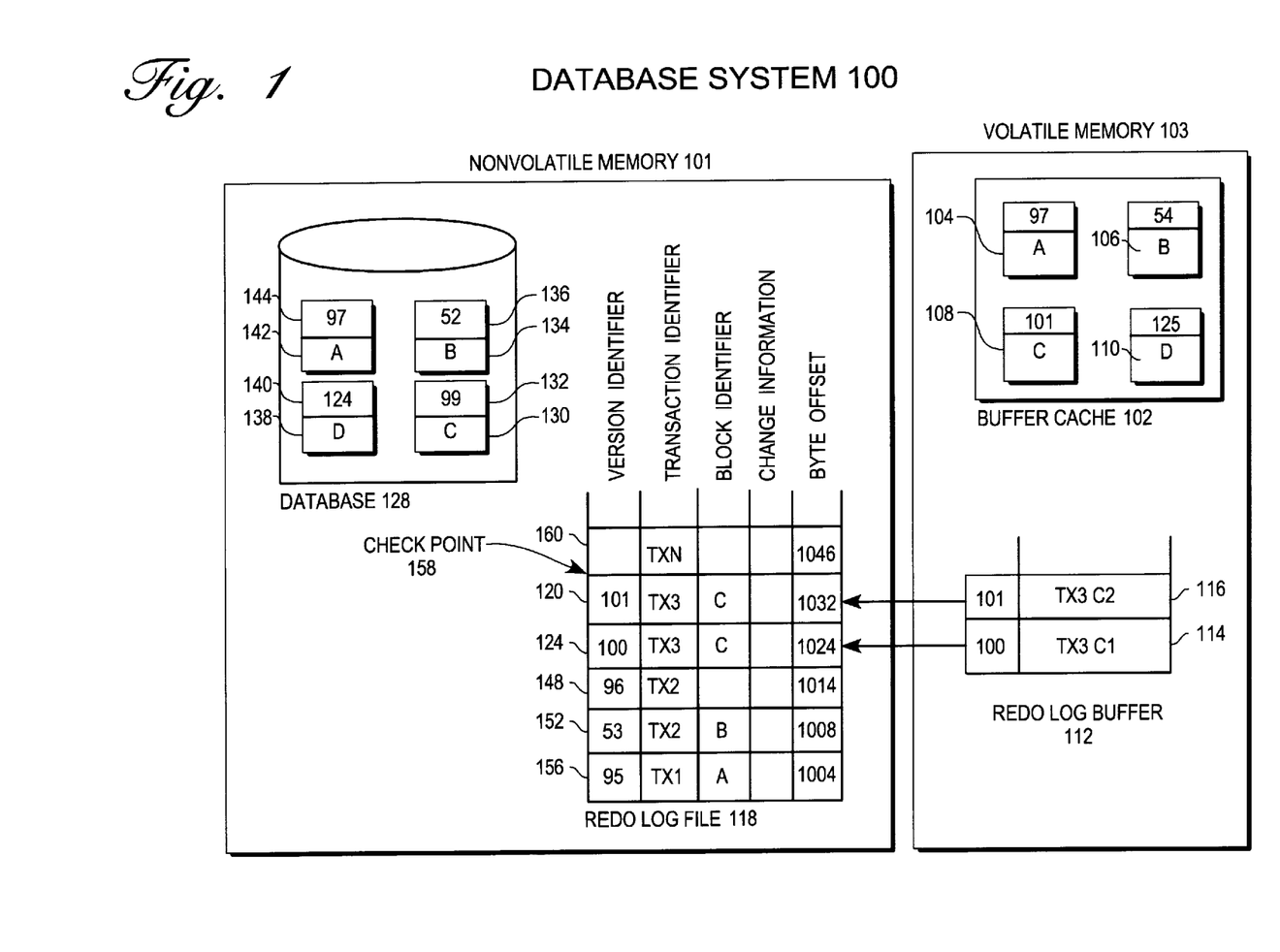
FIG. 1 is a block diagram that illustrates a recovery system that supports a conventional checkpointing procedure in a typical database system.

For example, FIG. 1 illustrates a redo-based recovery mechanism that can be used to perform changes that are recorded in a redo log file 118 in the event of a failure in the database system. As depicted in FIG. 1, database 128 and redo log file 118 reside within the nonvolatile memory 101 of database system 100. Conversely, buffer cache 102 and redo log buffer 112 reside within the volatile memory 103 of database system 100. Buffer cache 102 contains buffers 104, 106, 108, and 110 which respectively contain data loaded into volatile memory 103 from data items 142, 134, 130 and 138 within database 128. For the purposes of explanation, it shall be assumed that data items 142, 134, 130 and 108 are respectively disk blocks A, B, C and D from the database 128.

Contained within redo log buffer 112 are redo records 114 and 116 which describe the changes made to data item 108 by a transaction (TX3). By the time transaction TX3 commits, the information that is contained in redo records 114 and 116 is stored in redo log file 118 as redo records 124 and 120 respectively. The version identifier associated with each redo record is copied into the redo log file and is used in determining whether the associated data item in the database reflects the changes that are recorded in the particular redo record.

Performing Recovery with Redo Records

If a database failure occurs, all information contained in volatile memory 103 may be lost. Such information may include buffers within buffer cache 102 that contain data items that have been updated by transactions, but that had not yet been saved to non-volatile memory 101. As mentioned above, it is essential for the committed updates made by all such transactions to be reflected in the persistently-stored versions of the data items within the database 128.

To ensure that updates made by transactions are reflected in the database 128 after a failure, redo records in the redo log file 118 are sequentially processed after a failure. A redo record is processed by reading the redo record from the redo log file 118 and then retrieving the data item identified in the redo record. The process performing the recovery (the "recovery process") then determines if the change specified in the redo record is already reflected in the copy of the data item that is stored in the database 128. If the change is not reflected to the data item, then the change is applied to the data item. Otherwise, the change is not applied to the data item and the next redo record in the redo log file 118 is processed.

In a conventional redo-based approach to recovery, the recovery process determines whether the change identified in a redo record has already been applied to a data item by reading a version identifier from the data item and comparing the version identifier from the data item to the version identifier stored in the redo record. If the version identifier stored in the redo record is newer than the version identifier associated with the data item, then the buffer that contained the updated data item had not been written from the buffer cache 102 back to the database 128 prior to the failure. Therefore, the change must be applied to the on-disk copy of the data item that is stored in the database 128. On the other hand, if the version identifier associated with the data item is at least as recent as the version identifier stored in the redo record, then the change does not need to be reapplied.

For example, assume that a failure occurs and all of the information stored in volatile memory 103 is lost. If the version identifiers associated with redo records 120 and 124 are newer than the version identifier 132 of data item 130 in database 128, then the changes made by the committed transaction TX3 to data item 130 had not been written to the on-disk version of the data item 130 prior to the failure. On the other hand, if version identifier 132 of data item 130 in database 128 is at least as recent as the version identifiers associated with redo records 120 and 124, then the changes caused by transaction TX3 were written to the on-disk version of data item 130 prior to the failure.

Although the redo log file 118 provides for the recovery of changes made by transactions that have not been applied to the database prior to a failure, it is inefficient to process all of the redo records of redo log file 118 when a high percentage of those records are for changes that have already been stored in the database 128. In addition, because the redo log file is continually growing, a recovery operation can become quite time consuming.

For example, in FIG. 1, upon a failure in database system 100, data item 142 and redo record 156 must be read into volatile memory 103 in order to compare version identifier 144 with the version identifier associated with redo record 156. The process of reading data item 142 and redo record 156 into memory creates unnecessary overhead, since version identifier 144 is newer than (i.e. greater than) the version identifier associated with redo record 156, and therefore the change recorded in redo record 156 is already reflected in database 128.

Checkpoints

In order to reduce the number of data items and redo records that are unnecessarily read into memory during a recovery operation, a checkpoint operation may be periodically executed. During a checkpoint operation, all "dirty" buffers that are currently stored in the buffer cache 102 are written into the database 128. A "dirty" buffer is defined as a buffer in the buffer cache 102 that contains data that has been modified by a transaction but has not yet been written back to the database 128. After a checkpoint operation is performed, all changes identified in redo records that were contained in the redo log file 118 prior to when the checkpoint operation was initiated will be reflected in the database 128. Therefore, those records will not have to be processed after a failure.

To indicate which redo records in the redo log file 11 8 do not have to be processed after a failure, a "checkpoint value" is stored in nonvolatile memory 101. The checkpoint value indicates the boundary within redo log file 118 between redo records that must be processed after a failure and redo records that do not have to be processed after a failure. The checkpoint value may be, for example, a byte offset from the beginning of the redo log file 118, where all redo records that are stored in the redo log file before the location identified by the checkpoint value are guaranteed to be reflected in the database.

For example, as illustrated in FIG. 1, in executing the checkpoint operation on database system 100, a checkpoint process begins by storing a byte offset (i.e. the end of redo record 120) which represents where the next redo record is to be allocated in redo log file 118. The checkpoint process then marks as needing checkpointing all buffers in buffer cache 102 that contain changes since being loaded from database 128. After marking the appropriate buffers, the checkpoint process then writes the marked buffers within buffer cache 102 back to the database 128. After the dirty buffers are successfully written back to the database, the checkpoint 158 is set equal to the previously stored byte offset (i.e. end of redo record 120). Redo record 160 represents the redo records that were stored in the redo log file 118 after the checkpoint operation began.

In the event of a subsequent failure, the recovery process can begin processing with redo record 160 (i.e. the record that follows checkpoint 158). The redo records that precede the checkpoint 158 (i.e. redo records 120, 124, 148, 152 and 156) may be ignored because the changes reflected therein have previously been written to database 128.

Because redo log files can potentially contain an extremely large number of redo records, performing checkpoint operations on the redo log file 118 can significantly reduce recovery time as the recovery process is no longer required to begin the recovery phase with the first redo record in the redo log file. Instead, the recovery process can begin the recovery phase at the latest checkpoint value.

However, because the buffer cache 102 can contain a large number of dirty buffers, a significant amount of time can elapse between when the checkpoint operation begins and when the checkpoint operation completes. Therefore, by the time the checkpoint process completes it execution, a significant number of redo records will generally have been written into the redo log. Many of these redo records may be associated with changes that have already been written back into the database. In addition, if a failure occurs prior to the completion of the checkpoint process, the previously stored checkpoint value must be used which requires an even greater number of unnecessary redo records to be processed.

Therefore, it is highly desirable to provide a mechanism for performing checkpoint operations without having to flush the entire buffer cache.

SUMMARY OF THE INVENTION

A method and system for maintaining a checkpoint value that indicates which records of a plurality of records associated with updates made before a failure have to be processed after the failure is provided. According to one aspect of the invention, an ordered list of buffers is maintained in volatile memory. The ordered list of buffers has a head and a tail. The ordered list of buffers is maintained by writing a record that indicates the update to nonvolatile memory and adding the buffer to the tail of the ordered list whenever an update is made to a data item within a buffer in volatile memory. When a data item contained in a buffer within the ordered list is stored in nonvolatile memory, the buffer can be removed from the ordered list. A checkpoint value that identifies a record associated with a buffer located at the head of the ordered list is written to nonvolatile memory.

After a failure, the record associated with the checkpoint value is identified. If a particular record was stored to nonvolatile memory before the record associated with the checkpoint value, the particular record is not processed. If the particular record was not stored to nonvolatile memory before the record associated with the checkpoint value, the particular record is processed.

In certain aspects of the invention, a buffer is added to the tail of the ordered list by obtaining an index value that corresponds to a storage location in nonvolatile memory, storing the index value as the index value for the buffer, and inserting the buffer into the ordered list based on the index value for the buffer.

According to certain aspects of the invention, buffers are added to the tail of one of a plurality of ordered lists. The record associated with a particular buffer located at the head of one of the plurality of ordered lists containing a smallest index value is written as the checkpoint value to nonvolatile memory. Buffers are removed by removing buffers from one of the plurality of ordered lists.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for increasing the efficiency of recovery using a continually advancing checkpoint value in database systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 2:
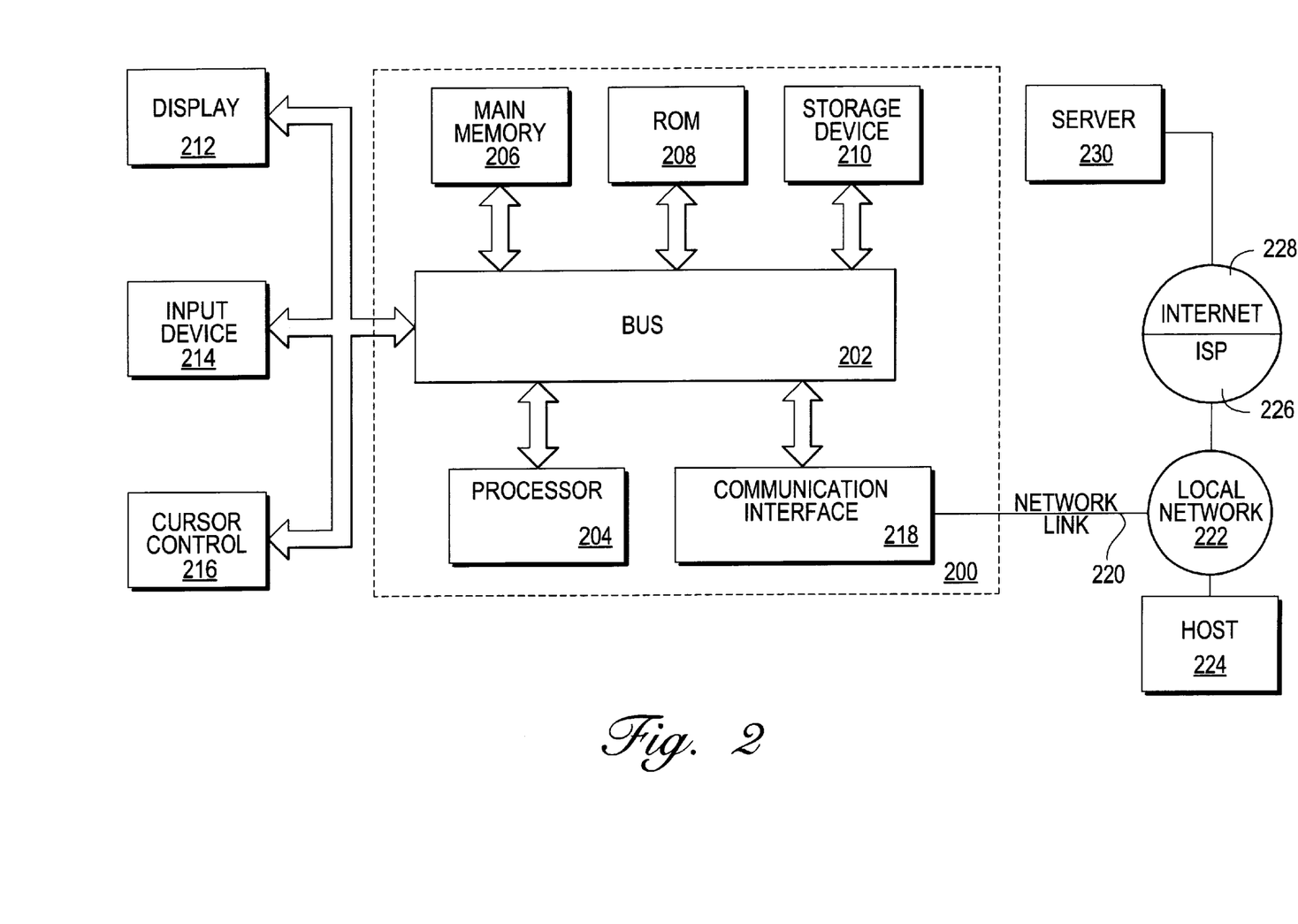
FIG. 2 is a block diagram illustrating a computer system on which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The present invention is related to the use of computer system 200 for performing checkpoint operations. According to one embodiment, checkpoint operations are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. in any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for performing checkpoint operations as described herein.

The received code may be executed by processor 204 as it is received, and/or stored in storage device 210, or other non-volatile storage for later execution. In this manner, computer system 200 may obtain application code in the form of a carrier wave.

Incremental Checkpointing Overview

In one embodiment of the present invention, a sorted buffer queue is used to continually advance a checkpoint value to reduce the recovery time in the event of a failure. A sorted buffer queue that contains updated buffers as queue entries is maintained in volatile memory. An index value corresponding to where the redo record is stored in nonvolatile memory is associated with each queue entry within the sorted buffer queue. The index value associated with each queue entry is used to sort the queue entry into the tail of the sorted buffer queue.

A queue entry is removed from the sorted buffer queue only after the changes associated with the queue entry have been written back to the database. By periodically storing as a checkpoint value the index value associated with the queue entry that is currently at the head of the sorted buffer queue, an incrementing checkpoint is maintained which guarantees that all redo records that were written into nonvolatile memory prior to the checkpoint are reflected in the database. Thus, in the event of a failure, the overhead of applying redo records during recovery is reduced by not processing the redo records that were written to nonvolatile memory prior to the checkpoint value.

Inserting Buffers into a Sorted Buffer Queue

Figure 3:
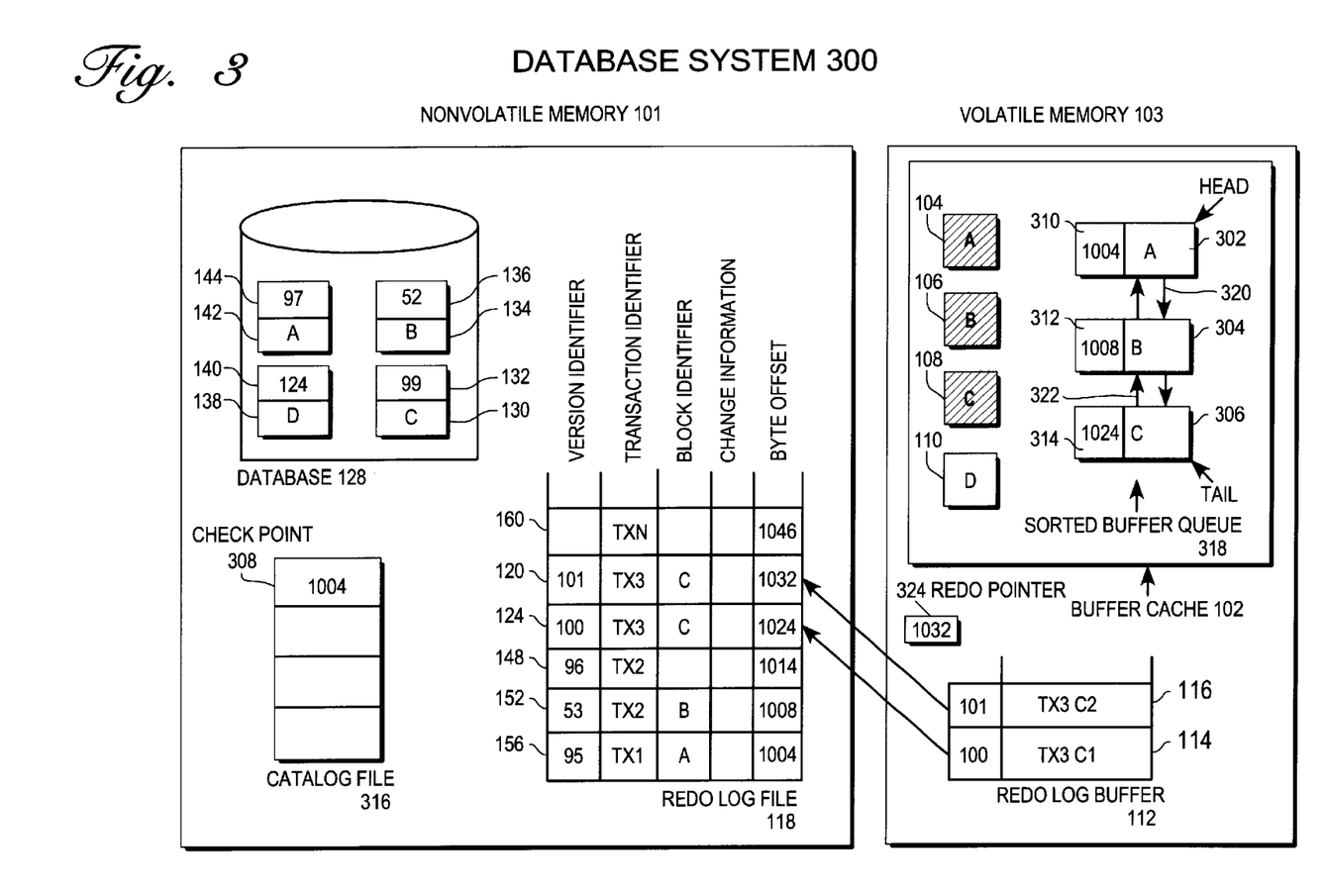
FIG. 3 is a block diagram illustrating one embodiment in which a single sorted queue is used to incrementally increase the checkpoint value.

FIG. 3 is a block diagram depicting an embodiment of the present invention in which a sorted buffer queue is used to continually advance the checkpoint value in a database system. As many of the components in FIG. 3 are similar to those in FIG. 1, like components have been assigned like reference numbers.

As depicted in FIG. 3, buffer cache 102 contains buffers 104, 106, 108 and 110 which have been previously loaded from database 128. Whenever a transaction attempts to update a buffer in buffer cache 102, a redo record is allocated in redo log buffer 112 to hold a description of the changes that are to made to the specific buffer. When allocating space for the redo record in the redo log buffer 112, the redo record is initially marked invalid. In addition to allocating space in redo log buffer 112, space for storing the redo record is also allocated in redo log file 118. A byte offset in redo log file 118 indicates the start of the particular redo record within redo log file 118.

After the redo record in redo log buffer 112 is marked invalid, the description of the changes that are to be made to the specific buffer is copied into the particular redo record within redo log buffer 112. Next, using the byte offset of the associated redo record in redo log file 118, the specific buffer is sorted into the tail of sorted buffer queue 318 and becomes a queue entry. Each sorted buffer queue contains a latch that allows only one queue entry to be sorted into the sorted buffer queue at a time. After the buffer becomes a queue entry, the associated redo record in redo log buffer 112 is mark valid. If a failure occurs before the associated redo record in redo log buffer 112 is marked valid, the redo information is considered invalid and therefore not to exist.

After the redo record in redo log buffer 112 is marked valid, the description of the changes are copied into the particular redo record within redo log file 118. The location of the particular redo record within redo log file 118 is stored in volatile memory as redo pointer 324 and indicates the position of the last redo record which was written into redo log file 118. The updating of the particular buffer to reflect the changes described in the redo record can be accomplished either before or after the changes are copied into the particular redo record within redo log file 118.

Buffers 104, 106 and 108 represent buffers that have been updated since being loaded from database 128 and are respectively depicted as queue entries 302, 304 and 306 in sorted buffer queue 318. FIG. 3 depicts two copies of buffers A, B, and C in the buffer cache 102: one copy belonging to the sorted buffer queue 318 and another copy separate from the sorted buffer queue 318. However, there is preferably only one copy of each buffer maintained, and the copy may belong to any number of queues in addition to the sorted buffer queue 318.

Checkpoint 308 represents the current checkpoint value. In the illustrated embodiment, the checkpoint 308 is in the form of a byte offset of a particular redo log record within the redo log file 118. As shown here, checkpoint 308 is contained within a catalog file 316 and is currently set equal to byte offset 1004, which represents the beginning of redo log record 156. In certain embodiments of the present invention, a separate sector is maintained within the catalog file for storing a separate checkpoint value for each database server accessing database 128 to reduce access contention between multiple database servers within a database system.

As stated above, sorted buffer queue 318 currently contains queue entries 302, 304 and 306. Each queue entry contains an index value that is used to sort the queue entries into the tail of buffer queue 318. The index value of each queue entry equals the byte offset value in redo log file 118 of the first redo log record that describes changes to the block in the queue entry. In an alternative embodiment of the present invention, the index value corresponds to a counter value that indicates when the associated redo record in redo log file 118 was allocated.

Figure 4:
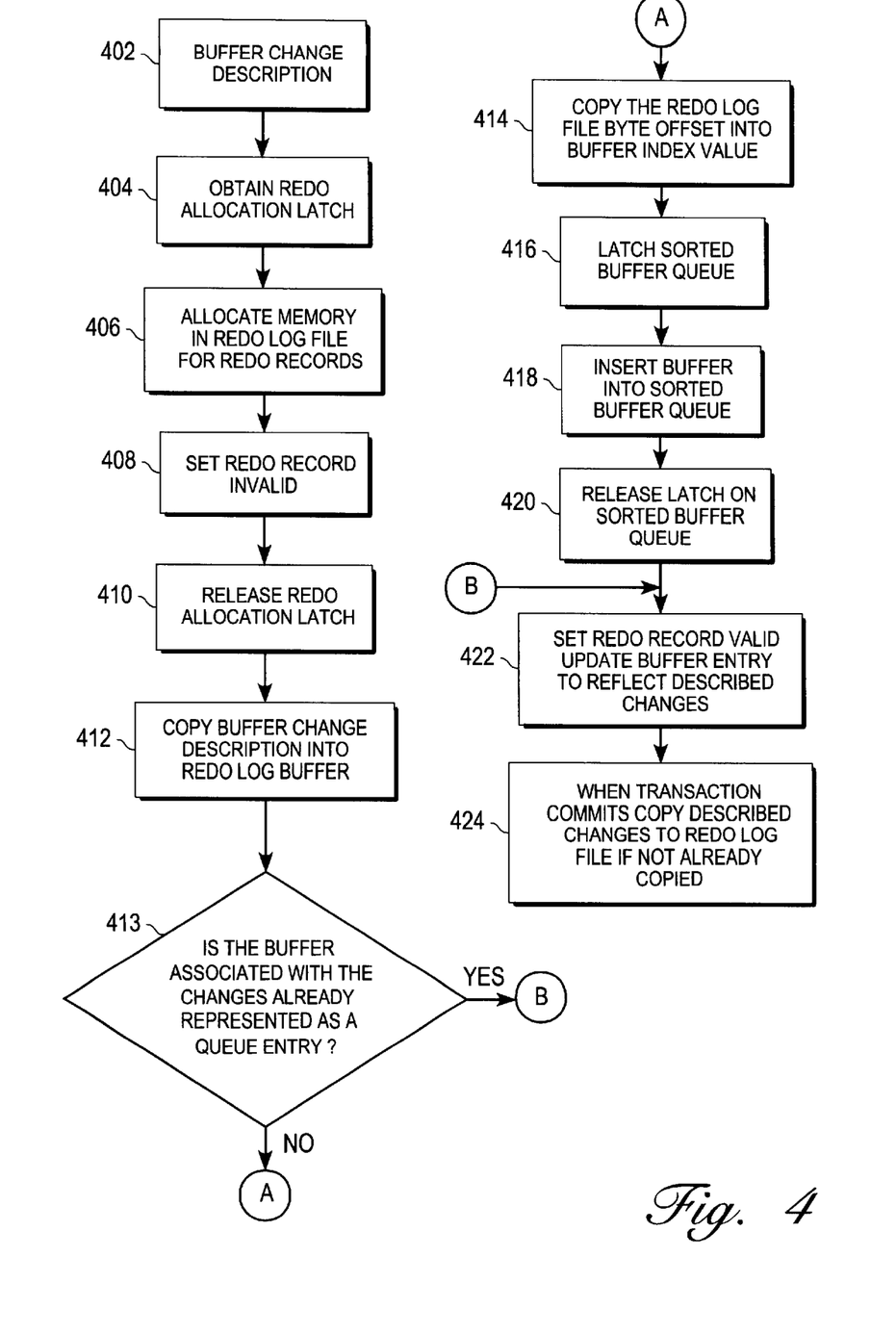
FIG. 4 is a flow diagrams illustrating steps for incrementally increasing the checkpoint value using a single sorted queue.

For example, FIG. 4 is a flow diagram that illustrates the steps of inserting queue entries into a sorted buffer queue according to certain embodiments of the present invention. At step 402, a description of changes to buffer 108, caused by transaction TX3_C1 are maintained in volatile memory 103.

At step 404, a latch is obtained for redo log buffer 112 and redo log file 118 to limit access by other processes. At step 406, space is allocated in redo log buffer 112 and redo log file 118 for storing the TX3_C1 change description in redo records 114 and 124. At step 408, redo record 114 is marked invalid to indicate that the information contained within the redo record 114 is not currently valid.

At step 410, the latch on redo log buffer 112 and redo log file 118 is released to allow other processes access to redo log buffer 112 and redo log file 118. At step 412, the description of the changes for buffer 108 is copied into redo record 114 in redo log buffer 112.

At step 413, the buffer 108 to which the changes are to be made is examined to determine if it is currently represented as a queue entry in the sorted buffer queue 318. If the buffer 108 to which the changes are to be made is currently represented as a queue entry in the sorted buffer queue 318, then control passes to step 422. Otherwise, if the buffer 108 associated with the changes is not currently represented as a queue entry in the sorted buffer queue 318 then at step 414, the byte offset value associated with redo record 124 is copied into the index field 314 associated with buffer 108.

At step 416, a latch is obtained in order to restrict access to sorted buffer queue 318 by other processes. At step 418, buffer 108 is sorted into the tail of sorted buffer queue 318 as queue entry 306 using index value 314. Because the index value 314 (which, in the illustrated example, is 1024) is greater than or equal to the index value 312 associated with queue entry 304 (which is 1008), queue entry 306 is inserted into sorted buffer queue 318 following queue entry 304. However, if the index value 314 was less than the index value 312, queue entry 306 would have been inserted into sorted buffer queue 318 ahead of queue entry 304.

At step 420, the latch on sorted buffer queue 318 is released to allow other processes to insert entries into the sorted buffer queue 318. At step 422, the buffer C associated with queue entry 306 is updated to reflect the changes described in redo record 114. At step 424, redo record 114 in redo log buffer 112 is copied into redo record 124 of redo log file 118. The operation of copying redo record 114 into redo log buffer 112 may occur at any time before the transaction (TX3) that made the change reflected in the redo record 114 commits.

As depicted in FIG. 3, each buffer is associated with no more than one queue entry in sorted buffer queue 318 at any given time. Therefore, when a second update is performed on a buffer (either by the same transaction of a different transaction than the transaction that performed the first update) that is already represented as a queue entry in sorted buffer queue 318, a new queue entry is not inserted into the sorted buffer queue 318. Instead, the buffer associated with the queue entry is updated to reflect the second update while maintaining its position in the sorted buffer queue 318. In addition, the index value associated with the queue entry is not updated to reflect the byte offset in the redo log file 118 of the new redo record generated for the second update.

For example, referring to FIG. 4, if at step 413 a queue entry 306 associated with buffer C is already contained within sorted buffer queue 318, then the byte offset associated with redo record 120 in redo log file 118 is not stored as index value 314. Instead, control passes to step 422, where buffer C associated with queue entry 306 is updated to reflect the changes described in redo record 116 while maintaining its current position.

In the description given above, space for a redo record is allocated in redo log file 118 before the buffer associated with the redo record is added to sorted buffer queue 318. This allows the byte offset of the allocated space to be used as the index value used to sort the buffer into the sorted buffer queue 318. However, in an alternative embodiment, buffers can be added to the sorted buffer queue 318 before allocating space in the redo log file 118 for the redo record for the update to the buffer.

In an embodiment that adds a buffer to the sorted buffer queue 318 before allocating space in the redo log file for the redo record for the update to the buffer, the buffer is added to the tail of the sorted buffer queue 318. After the buffer is added to the sorted buffer queue, space for the corresponding redo record is allocated, and the byte offset of the allocated space is stored in the queue entry associated with the buffer. For the order of the sorted buffer queue to be accurate, later-added buffer entries must be assigned higher byte offset values. Therefore, precautions have to be taken to ensure that space is allocated for the redo record of a buffer before space is allocated for redo records of buffers associated with subsequently added queue entries. This may be accomplished, for example, by holding the latch associated with the sorted buffer queue 318 until space is allocated in the redo log file 118, thereby preventing additional entries to be placed on the sorted buffer queue 318 until space is allocated. Alternatively, a separate process may assume the responsibility for allocating space in the redo log file 118 for the redo records associated with the buffers in the sorted buffer queue 318. The process would allocate space for the redo records based on the order in which buffers are stored in the sorted buffer queue 318, thus ensuring that index entries in the queue that follow a particular entry will be assigned higher index values than the particular entry.

Inserting Buffers into Multiple Sorted Buffer Queues

Figure 5:
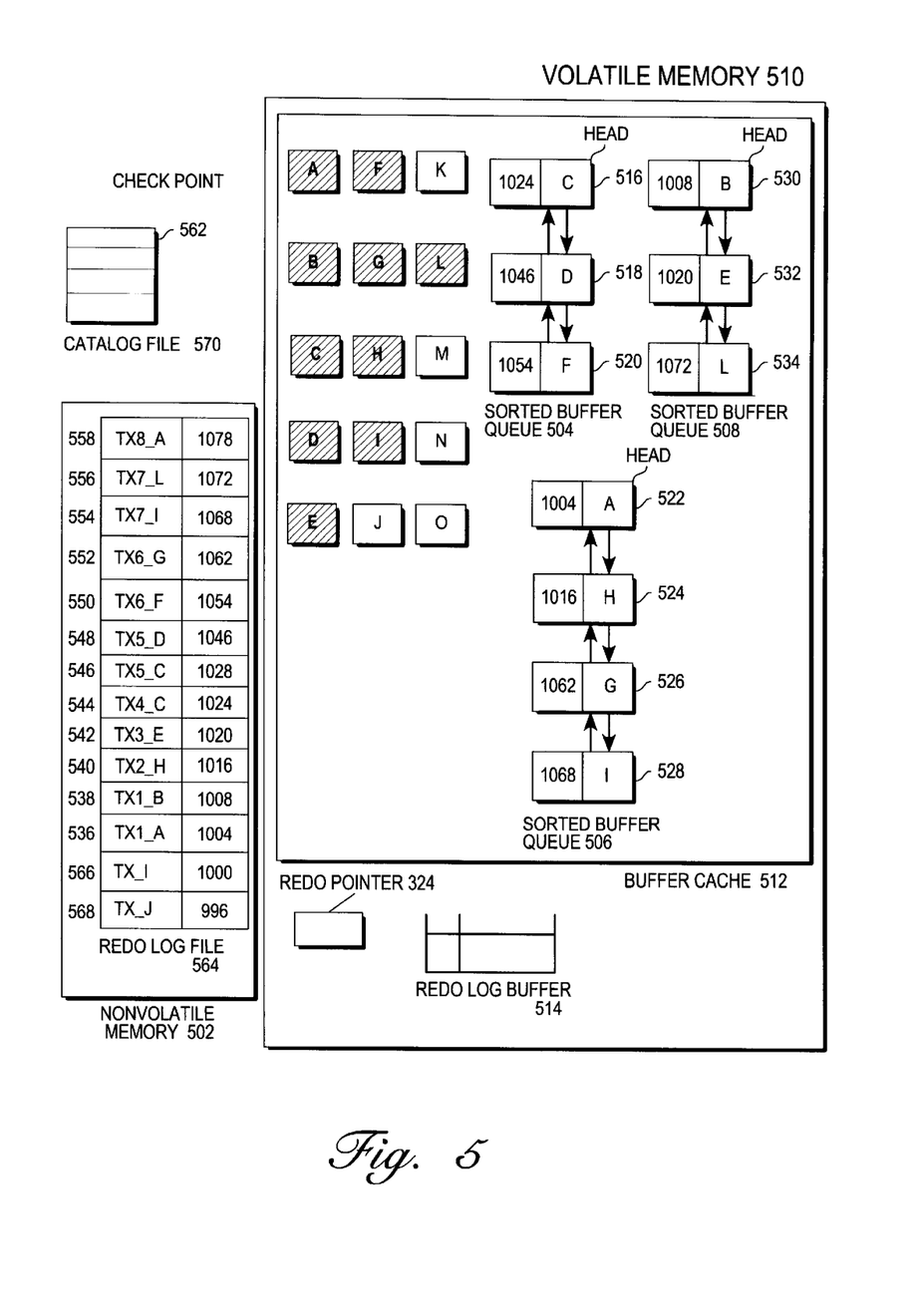
FIG. 5 is a block diagram illustrating one embodiment in which multiple sorted queues are used to incrementally increase the checkpoint value.

Although FIG. 3 depicts a single sorted buffer queue, in certain embodiments of the invention, multiple sorted buffer queues are used to increase the concurrency of the database system. FIG. 5 depicts an alternative embodiment in which multiple sorted queues are used to incrementally increase the checkpoint value in a database system.

As depicted in FIG. 5, by using multiple sorted buffer queues, concurrent processing within the database can be increased as sorted queues are more readily available for each process. By increasing the number of sorted queues, a process is less likely to have to wait to obtain a latch in order to insert a queue entry into a sorted buffer queue.

In one embodiment, a sorted buffer queue is maintained and associated for each least recently used (LRU) list within the database server. The LRU lists contain buffers within buffer cache 512 that are ordered within the LRU lists by when they were last accessed.

In using multiple sorted buffer queues, several techniques can be used to select which sorted buffer queue a particular queue entry will be sorted into. However, once the sorted buffer queue is chosen, the steps required for inserting the particular queue entry into the sorted buffer queue are the same as previously described above for inserting queue entries in a single sorted buffer queue.

Storing the Checkpoint Value a Single Buffer Queue

By periodically writing the index value associated with the queue entry located at the head of sorted buffer queue 318 into of checkpoint 308 on a repeatable basis, the checkpoint value is advanced as new queue entries are moved to the head of sorted buffer queue 318. In one embodiment of the present invention, the index value associated with the queue entry located at the head of the sorted buffer queue 318 is stored in checkpoint 308 on a periodic basis. For example, using a timer, a process can be scheduled to store the index value associated with the queue entry located at the head of sorted buffer queue 318 into checkpoint 308 every three seconds.

In an alternative embodiment, the index value associated with the queue entry located at the head of the sorted buffer queue 318 is stored in checkpoint 308 whenever the process that is assigned the task of storing the checkpoint value is scheduled to execute.

It should be noted that the checkpoint value must never exceed the position of the last redo record that was written into redo log file 118. Therefore, before the value of the queue entry located at the head of sorted buffer queue 318 can be written into checkpoint 308 it must first be compared with the value of redo pointer 324. If the value of the queue entry located at the head of sorted buffer queue 318 is less than or equal to the value of redo pointer 324, the value of the queue entry is written into checkpoint 308. In certain embodiments of the invention, if the value of the queue entry located at the head of sorted buffer queue 318 is greater than the value of redo pointer 324, the value of redo pointer 324 is written into checkpoint 308.

For example, referring back to FIG. 3, the checkpoint value is advanced when the index value 310 associated with queue entry 302 is stored as the value of checkpoint 308. Because the queue entries are maintained in a sorted order within sorted buffer queue 318, all entries in redo log file 118 prior to redo record 156 (e.g. byte offset 1004) are guaranteed to be reflected on database 128. Therefore, each time a new queue entry is moved to the head of sorted buffer queue 318 and the associated index value is written into checkpoint 308, the checkpoint value is advanced. By maintaining a separate checkpoint sector in catalog file 316 for each database server (each of which will have its own redo log file), concurrency of the database system is increased as multiple database servers can update their checkpoint values concurrently.

In certain situations, sorted buffer queue 318 may become empty and therefore not contain any queue entries. When this occurs, in certain embodiments of the invention, the value of redo pointer 324 is stored in checkpoint 308 as the current checkpoint value.

Storing Checkpoint Values using Multiple Buffer Queues

When multiple sorted buffer queues are used, an index value associated with a queue entry at the head of one of the sorted buffer queues is selected for updating the checkpoint value. In one embodiment of the invention, the index values that are associated with the queue entries at the head of each sorted buffer queue are compared to determine a checkpoint value. By selecting the index entry with the smallest value, all entries previously written in the redo log file are guaranteed to be reflected on the database.

For example, referring to FIG. 5, queue entries 516, 522 and 530 are currently located at the head of sorted buffer queues 504, 506 and 508 respectively. As depicted in FIG. 5, the index value associated with queue entry 522, currently contains the smallest value. By selecting and storing in checkpoint 562, the index value associated with queue entry 522, the checkpoint value can be advanced to a valid value as all redo records in redo log file 564 prior to redo record 536 (e.g. byte offset 1004), are guaranteed to be reflected in nonvolatile memory 502.

As stated above, it should be noted that the checkpoint value must never exceed the position of the last redo record that was written into redo log file 564. Therefore, before the value of the queue entry associated with the smallest value can be written into checkpoint 562 it must first be compared with the value of redo pointer 324. If the queue entry associated with the smallest value is less than or equal to the value of redo pointer 324, the queue entry associated with the smallest value is written into checkpoint 308.

In certain embodiments of the invention, if the queue entry associated with the smallest value is greater than the value of redo pointer 324, the value redo pointer 324 is written into checkpoint 562.

In certain situations, all sorted buffer queues may become empty and therefore not contain any queue entries. When this occurs, in one embodiment of the invention, the value of redo pointer 324 is stored in the catalog file 570 as the current checkpoint value.

Writing Queue Entry Information to the Database

According to one embodiment of the invention, a process (herein referred to as "DB Writer" or "DBWR") is responsible for writing buffers that contain updated data back to nonvolatile memory in order reflect the changes in the database. By writing information from the queue entries that are currently at the head of the sorted buffer queues, the queue entries at the head of the sorted buffer queue can be removed from the sorted buffer queue. Consequently, the next time a checkpoint value is stored, the new checkpoint value will be from an index entry that followed the index entry associated with the current checkpoint value, and therefore will effectively advance the checkpoint. In one embodiment of the present invention, DBWR continually writes back to the database buffers from queue entries that are nearest the head of the sorted buffer queue.

Removing Queue Entries from a Sorted Buffer Queue

Queue entries can be removed from anywhere in the sorted buffer queue. Thus, a queue entry is not required to be at the head of the sorted buffer queue before it can be removed. However, a queue entry can only be removed from the sorted buffer queue after the buffer associated with the queue entry has been written back to the database.

In one embodiment of the invention, the sorted buffer queues are maintained as a doubly linked list of queue entries. Maintaining a sorted buffer queue as a doubly linked list allows a queue entry to be easily removed from anywhere within the sorted buffer queue.

For example, referring to FIG. 3, if the information contained in queue entry 304 is written back to database 128, then queue entry 304 can be removed from sorted buffer queue 318 even though it is not at the head of the sorted buffer queue 318. This is accomplished by reconnecting the link 320 from queue entry 304 to queue entry 306 and reconnecting the link 322 from queue entry 304 to queue entry 302. Removing queue entry 304 will not allow the checkpoint value to advance because only the index value associated with the queue entry at the head of the queue is stored as the checkpoint 308.

The number of queue entries in a sorted buffer queue changes dynamically during the execution of the database system that maintains the sorted buffer queue. Generally, it is preferable to prevent a sorted buffer queue from becoming too long. Therefore, in certain embodiments, flags are used to control the process responsible for removing entries (the "removal process") in response to number of queue entries that are contained within the sorted buffer queue.

In certain embodiments of the invention, flags are used by the removal process to determine the number of queue entries to be removed from the sorted buffer queue. For example, a half-full flag may be used to indicate if the number of entries in the sorted buffer queue 318 is less than half the number of buffers in the buffer cache. If the half-full flag is not set, then the removal process does not remove entries from the sorted buffer queue 318. If the half-full flag is set, then the removal process removes entries from the sorted buffer queue 318.

In addition to the half-full flag, a full flag may be used to communicate to the removal process that queue entries need to be removed at a faster rate because the sorted buffer queue 318 is filled with more than a particular number of queue entries. There are various ways to increase the rate at which queue entries are removed. For example, the number of queue entries removed upon each invocation of the removal process may be increased. Instead of or in addition to increasing the number of queue entries removed upon each invocation, the rate at which the removal process executes may also be increased.

Depending on the status of the flags, the removal process attempts to remove a particular number of queue entries from the sorted buffer queue each time it is scheduled to execute. As stated above, queue entries can only be removed after their information has been written back to the database. Therefore, queue entries may be skipped and not removed if their information has not previously been written back to the database.

For example, if the removal process is scheduled to remove two queue entries from sorted buffer queue 318 and only the information contained in queue entry 304 has not yet been written back to database 128, then the removal process would remove queue entries 302 and 306. Therefore, after the removal process completed, queue entry 304 would be at the head of sorted buffer queue 318.

In certain situations, a process may attempt to update a queue entry as it is being removed from the sorted buffer queue. Therefore, in one embodiment of the invention, all updates to queue entries that are currently being removed from the sorted buffer queue are blocked until after the queue entry is removed. After the removal process is complete the update proceeds and the queue entry is inserted back into the sorted buffer queue as described above.

In an alternative embodiment of the invention, the update is allowed to continue and once the removal process completes a new index value is associated with the queue entry and the queue entry is re-linked by sorting it back into the tail of the sorted buffer queue based on the associated new index value.

Removing Queue Entries from Multiple Sorted Buffer Queues

When multiple sorted queues are used, the removal process must determine not only how many queue entries are to removed each time it is scheduled to execute but also, from which sorted buffer queues the queue entries should be removed. In one embodiment of the invention, each sorted buffer queue is associated with a half-full and full flag as described above. These flags are used in determining how many queue entries are to be removed from each of the sorted buffer queues each time the removal process is scheduled to execute.

In certain embodiments of the invention, the removal process attempts to remove a particular number of queue entries from each of the sorted buffer queues each time it is scheduled to execute. As stated above, queue entries can be removed before they are at the head of the sorted buffer queue. In addition, queue entries are not removed and may be skipped if their information has not been written back to the database.

For example, referring to FIG. 5, if the removal process is scheduled to remove two queue entries from each of the sorted buffer queues, (e.g. sorted buffer queues 504, 506 and 508), then queue entries 516, 518, 522, 524, 530 and 532 would be removed from their respective sorted buffer queue if the information contained in each queue entry has been previously written back to the database. After removing queue entries 516, 518, 522, 524, 530 and 532, queue entries 520, 526 and 534 would be at the head of sorted buffer queues 504, 506 and 508 respectively.

However, if the information in a particular queue entry that is to be removed from the list has not been previously written back to the database, then the queue entry is skipped and the next queue entry is tested for removal. For example, if the information contained in queue entry 524 was not previously written back to the database, then queue entry 524 would be skipped and queue entry 526 would be removed instead if its information was previously written back to the database. In this example, after the removal process completed, queue entries 520, 524 and 534 would be at the head of sorted buffer queues 504, 506 and 508 respectively.

Although the removal processes previously described are depicted as being separate from the process tasked with writing queue entry information back to the database, in certain embodiments of the invention these processes are actually one in the same. For example, a single process can be used to both write the information contained in a particular queue entry back to the database and then remove the particular queue entry from the queue.

Recovering after a Failure

In the event of a failure, the value of checkpoint 308 indicates a boundary within redo log file 118 between redo records that must be processed after the failure and redo records that do not have to be processed. Because the checkpoint value is continually advanced, there is a reduced number of redo records in redo log file 118 that require processing during recovery after the failure.

To recover from a failure, the recovery process reads the associated checkpoint value from the catalog file. Because all redo records that were stored in redo log file 118 prior to the checkpoint value are guaranteed to already be reflected on database 128, in one embodiment of the invention, the recovery process begins processing the redo records starting with the redo record at the byte offset equal to the checkpoint value. Therefore, the recovery process is only required to process the redo records located at the byte offset that is equal to the checkpoint value and ones that were stored at byte offsets after the checkpoint value.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for maintaining a checkpoint value that indicates which records of a plurality of records associated with updates made before a failure have to be processed after the failure, the method comprising the steps of:
  maintaining an ordered list of buffers, wherein buffers within said ordered list of buffers reside in volatile memory, wherein the ordered list of buffers has a head and a tail, the step of maintaining the ordered list including the steps of
    when an update is made to a data item within a buffer in volatile memory, performing the steps of
      writing a record that indicates the update to nonvolatile memory; and
      inserting the buffer into a particular position in said ordered list in a manner that preserves relative ordering of buffers already in said ordered list;
    when a data item contained in a buffer within the ordered list is stored in nonvolatile memory, removing the buffer from the ordered list; and
  writing to nonvolatile memory as said checkpoint value, a value that identifies a record of said plurality of records that is associated with a buffer that is currently located at the head of the ordered list.

2. The method of claim 1, further comprising performing the following steps after the failure:
  identifying the record associated with the checkpoint value;
  if a particular record was stored to nonvolatile memory before the record associated with the checkpoint value, then not processing the particular record; and
  if the particular record was not stored to nonvolatile memory before the record associated with the checkpoint value, then processing the particular record.

3. The method of claim 1, wherein the step of inserting the buffer into a particular position in said ordered list further comprises the step of sorting the buffer into the ordered list based on when the record associated with the buffer is stored to nonvolatile memory relative to when the records associated with the buffers that are already in the ordered list were stored to nonvolatile memory.

4. The method of claim 1, wherein the step of inserting the buffer into a particular position in said ordered list further comprises the step of sorting the buffer into the ordered list based on where the record associated with the buffer is stored in nonvolatile memory relative to where the records associated with the buffers that are already in the ordered list were stored in nonvolatile memory.

5. The method of claim 1, wherein the step of inserting the buffer into a particular position in said ordered list further comprises the step of adding the buffer to the ordered list only if the buffer does not already reside in the ordered list.

6. The method of claim 1, wherein the step of maintaining an ordered list of buffers further comprises the step of storing an index value with each buffer in the ordered list of buffers, wherein the index value indicates a storage location in nonvolatile memory of the record associated with the buffer.

7. The method of claim 2, wherein the step of processing the particular record if the particular record was not stored to nonvolatile memory before the record associated with the checkpoint value further comprises the step of processing all records sequentially stored at locations that follow a location at which the record associated with the checkpoint value is stored.

8. The method of claim 7, further comprising the step of processing the record associated with the checkpoint value.

9. The method of claim 1, wherein the step of writing to nonvolatile memory the checkpoint value further comprises the step of writing to nonvolatile memory the checkpoint value at predetermined time intervals.

10. The method of claim 1, wherein the step of writing to nonvolatile memory the checkpoint value further comprises the steps of:
  if said ordered list is empty, then
    determining a location of the record last written to nonvolatile memory; and
    storing the checkpoint value that is based on said location.

11. The method of claim 1, further comprising the step of causing a process that writes updated data items to nonvolatile memory to select which updated data items to write to nonvolatile memory based on which buffer is at the head of the ordered list.

12. The method of claim 1, wherein the step of removing the buffer from the ordered list further comprises the step of removing a particular number of the buffers, wherein the particular number of buffers that are removed dynamically adjusts according to how many of the buffers currently reside in the ordered list.

13. The method of claim 1, wherein the step of removing the buffer from the ordered list further comprises the step of removing a particular number of the buffers, wherein the step of removing the particular number of the buffers is performed at a frequency that dynamically adjusts according to how many buffers currently reside in the ordered list.

14. The method of claim 1, wherein the step of removing the buffer from the ordered list further comprises the step of removing the buffer from a position in said ordered list other than the head of the ordered list.

15. The method of claim 1, wherein the step of removing the buffer from the ordered list further comprises the steps of:
  determining if the buffer was updated while being removed from the ordered list;
  if the buffer was updated while being removed from the ordered list, then inserting the buffer back into the ordered list.

16. The method of claim 1, wherein the step of inserting the buffer into a particular position in said ordered list further comprises the steps of:

obtaining an index value, wherein the index value corresponds to a storage location in nonvolatile memory;

storing the index value as the index value for the buffer; and inserting the buffer into the ordered list based on the index value for the buffer.

17. The method of claim 1, wherein:

each buffer is associated with an index value, wherein said index value identifies where the record associated with each buffer is written to nonvolatile memory;

said step of inserting the buffer into a particular position in said ordered list includes the step of inserting the buffer into a particular position of one of a plurality of ordered lists;

said step of writing to nonvolatile memory as said checkpoint value the value that identifies the record associated with the buffer located at the head of the ordered list includes the step of writing to nonvolatile memory the checkpoint value that identifies the record associated with a particular buffer located at the head of one of the plurality of ordered lists, wherein said particular buffer is associated with a smallest index value of all buffers located at the head of the one of the plurality of ordered lists; and said step of removing the buffer from the ordered list includes the step of removing the buffer from one of the plurality of ordered lists.

18. The method of claim 1, wherein the step of inserting the buffer into a particular position in said ordered list further comprises the step of adding the buffer to the tail of the ordered list.

19. The method of claim 1, wherein the step of inserting the buffer into a particular position in said ordered list further comprises the step of adding the buffer in a position other than the tail of the ordered list.

20. The method of claim 1, wherein the step of removing the buffer from the ordered list further comprises the step of removing the buffer from a position in said ordered list without removing the buffer currently at the head of the ordered list.

21. A computer-readable medium carrying one or more sequences of instructions for for maintaining a checkpoint value that indicates which records of a plurality of records associated with updates made before a failure have to be processed after the failure, wherein execution of the one or more sequences of instructions by one or more processors causes the one or more processors to perform the steps of:

maintaining an ordered list of buffers, wherein buffers within said ordered list of buffers reside in volatile memory, wherein the ordered list of buffers has a head and a tail, the step of maintaining the ordered list including the steps of when an update is made to a data item within a buffer in volatile memory, performing the steps of writing a record that indicates the update to nonvolatile memory; and inserting the buffer into a particular position in said ordered list in a manner that preserves relative ordering of buffers already in said ordered list;

when a data item contained in a buffer within the ordered list is stored in nonvolatile memory, removing the buffer from the ordered list; and writing to nonvolatile memory as said checkpoint value, a value that identifies a record of said plurality of records that is associated with a buffer that is currently located at the head of the ordered list.

22. The computer-readable medium of claim 21, wherein the computer-readable medium further comprises instructions for performing the following steps after the failure:

identifying the record associated with the checkpoint value;

if a particular record was stored to nonvolatile memory before the record associated with the checkpoint value, then not processing the particular record; and if the particular record was not stored to nonvolatile memory before the record associated with the checkpoint value, then processing the particular record.

23. The computer-readable medium of claim 21, wherein the step of inserting the buffer into a particular position in said ordered list further comprises the step of sorting the buffer into the ordered list based on when the record associated with the buffer is stored to nonvolatile memory relative to when the records associated with the buffers that are already in the ordered list were stored to nonvolatile memory.

24. The computer-readable medium of claim 21, wherein the step of inserting the buffer into a particular position in said ordered list further comprises the step of sorting the buffer into the ordered list based on where the record associated with the buffer is stored in nonvolatile memory relative to where the records associated with the buffers that are already in the ordered list were stored in nonvolatile memory.

25. The computer-readable medium of claim 21, wherein the step of inserting the buffer into a particular position in said ordered list further comprises the step of adding the buffer to the ordered list only if the buffer does not already reside in the ordered list.

26. The computer-readable medium of claim 21, wherein the step of maintaining an ordered list of buffers further comprises the step of storing an index value with each buffer in the ordered list of buffers, wherein the index value indicates a storage location in nonvolatile memory of the record associated with the buffer.

27. The computer-readable medium of claim 22, wherein the step of processing the particular record if the particular record was not stored to nonvolatile memory before the record associated with the checkpoint value further comprises the step of processing all records sequentially stored at locations that follow a location at which the record associated with the checkpoint value is stored.

28. The computer-readable medium of claim 27, wherein the computer-readable medium further comprises instructions for performing the step of processing the record associated with the checkpoint value.

29. The computer-readable medium of claim 21, wherein the step of writing to nonvolatile memory the checkpoint value further comprises the step of writing to nonvolatile memory the checkpoint value at predetermined time intervals.

30. The computer-readable medium of claim 21, wherein the step of writing to nonvolatile memory the checkpoint value further comprises the steps of: if said ordered list is empty, then determining a location of the record last written to nonvolatile memory; and storing the checkpoint value that is based on said location.

31. The computer-readable medium of claim 21, wherein the computer-readable medium further comprises instructions for performing the step of causing a process that writes updated data items to nonvolatile memory to select which updated data items to write to nonvolatile memory based on which buffer is at the head of the ordered list.

32. The computer-readable medium of claim 21, wherein the step of removing the buffer from the ordered list further comprises the step of removing a particular number of the buffers, wherein the particular number of buffers that are removed dynamically adjusts according to how many of the buffers currently reside in the ordered list.

33. The computer-readable medium of claim 21, wherein the step of removing the buffer from the ordered list further comprises the step of removing a particular number of the buffers, wherein the step of removing the particular number of the buffers is performed at a frequency that dynamically adjusts according to how many buffers currently reside in the ordered list.

34. The computer-readable medium of claim 21, wherein the step of removing the buffer from the ordered list further comprises the step of removing the buffer from a position in said ordered list other than the head of the ordered list.

35. The computer-readable medium of claim 21, wherein the step of removing the buffer from the ordered list further comprises the steps of:
determining if the buffer was updated while being removed from the ordered list;
if the buffer was updated while being removed from the ordered list, then inserting the buffer back into the ordered list.

36. The computer-readable medium of claim 21, wherein the step of inserting the buffer into a particular position in said ordered list further comprises the steps of:
obtaining an index value, wherein the index value corresponds to a storage location in nonvolatile memory;
storing the index value as the index value for the buffer; and
inserting the buffer into the ordered list based on the index value for the buffer.

37. The computer-readable medium of claim 21, wherein:
each buffer is associated with an index value, wherein said index value identifies where the record associated with each buffer is written to nonvolatile memory;
said step of inserting the buffer into a particular position in said ordered list includes the step of inserting the buffer into a particular position of one of a plurality of ordered lists;
said step of writing to nonvolatile memory as said checkpoint value the value that identifies the record associated with the buffer located at the head of the ordered list includes the step of writing to nonvolatile memory the checkpoint value that identifies the record associated with a particular buffer located at the head of one of the plurality of ordered lists, wherein said particular buffer is associated with a smallest index value of all buffers located at the head of the one of the plurality of ordered lists; and
said step of removing the buffer from the ordered list includes the step of removing the buffer from one of the plurality of ordered lists.

38. The computer-readable medium of claim 21, wherein the step of inserting the buffer into a particular position in said ordered list further comprises the step of adding the buffer to the tail of the ordered list.

39. The computer-readable medium of claim 21, wherein the step of inserting the buffer into a particular position in said ordered list further comprises the step of adding the buffer in a position other than the tail of the ordered list.

40. The computer-readable medium of claim 21, wherein the step of removing the buffer from the ordered list further comprises the step of removing the buffer from a position in said ordered list without removing the buffer currently at the head of the ordered list.

41. A computer system for maintaining a checkpoint value that indicates which records of a plurality of records associated with updates made before a failure have to be processed after the failure, the computer system comprising:
a memory;
one or more processors coupled to the memory; and
a set of computer instructions contained in the memory, the set of computer instructions including computer instructions which when executed by the one or more processors, cause the one or more processors to perform the steps of:
maintaining an ordered list of buffers, wherein buffers within said ordered list of buffers reside in volatile memory, wherein the ordered list of buffers has a head and a tail, the step of maintaining the ordered list including the steps of
when an update is made to a data item within a buffer in volatile memory, performing the steps of
writing a record that indicates the update to nonvolatile memory; and
inserting the buffer into a particular position in said ordered list in a manner that preserves relative ordering of buffers already in said ordered list;
when a data item contained in a buffer within the ordered list is stored in nonvolatile memory, removing the buffer from the ordered list; and
writing to nonvolatile memory as said checkpoint value, a value that identifies a record of said plurality of records that is associated with a buffer that is currently located at the head of the ordered list.

42. The computer system of claim 41, wherein the set of computer instructions further comprises computer instructions for performing the following steps after the failure:
identifying the record associated with the checkpoint value;
if a particular record was stored to nonvolatile memory before the record associated with the checkpoint value, then not processing the particular record; and
if the particular record was not stored to nonvolatile memory before the record associated with the checkpoint value, then processing the particular record.

43. The computer system of claim 41, wherein the step of inserting the buffer into a particular position in said ordered list further comprises the step of sorting the buffer into the ordered list based on when the record associated with the buffer is stored to nonvolatile memory relative to when the records associated with the buffers that are already in the ordered list were stored to nonvolatile memory.

44. The computer system of claim 41, wherein the step of removing the buffer from the ordered list further comprises the step of removing a particular number of the buffers, wherein the particular number of buffers that are removed dynamically adjusts according to how many of the buffers currently reside in the ordered list.

45. The computer system of claim 41, wherein the step of inserting the buffer into a particular position in said ordered list further comprises the steps of:
obtaining an index value, wherein the index value corresponds to a storage location in nonvolatile memory;
storing the index value as the index value for the buffer; and
inserting the buffer into the ordered list based on the index value for the buffer.

46. The computer system of claim 41, wherein:
  each buffer is associated with an index value, wherein said index value identifies where the record associated with each buffer is written to nonvolatile memory;
  said step of inserting the buffer into a particular position in said ordered list includes the step of inserting the buffer into a particular position of one of a plurality of ordered lists;
  said step of writing to nonvolatile memory as said checkpoint value the value that identifies the record associated with the buffer located at the head of the ordered list includes the step of writing to nonvolatile memory the checkpoint value that identifies the record associated with a particular buffer located at the head of one of the plurality of ordered lists, wherein said particular buffer is associated with a smallest index value of all buffers located at the head of the one of the plurality of ordered lists; and
  said step of removing the buffer from the ordered list includes the step of removing the buffer from one of the plurality of ordered lists.

47. The computer system of claim 35, wherein the step of inserting the buffer into a particular position in said ordered list further comprises the step of adding the buffer to the tail of the ordered list.

48. The computer system of claim 35, wherein the step of inserting the buffer into a particular position in said ordered list further comprises the step of adding the buffer in a position other than the tail of the ordered list.

49. The computer system of claim 35, wherein the step of removing the buffer from the ordered list further comprises the step of removing the buffer from a position in said ordered list without removing the buffer currently at the head of the ordered list.

50. A method for maintaining a checkpoint value that indicates which records of a plurality of records associated with updates made before a failure have to be processed after the failure, the method comprising the steps of:
  maintaining a sorted buffer queue that includes a head and a tail, wherein the sorted buffer queue includes queue entries that are inserted into said sorted buffer queue based on an index value that is associated with each queue entry;
  removing queue entries from said sorted buffer queue only after information associated with said queue entries is stored in nonvolatile memory; and
  repeatedly updating the checkpoint value to equal the index value that is currently associated with the queue entry at the head of the sorted buffer queue.

51. A computer-readable medium carrying one or more sequences of instructions for maintaining a checkpoint value that indicates which records of a plurality of records associated with updates made before a failure have to be processed after the failure, wherein execution of the one or more sequences of instructions by one or more processors causes the one or more processors to perform the steps of:
  maintaining a sorted buffer queue that includes a head and a tail, wherein the sorted buffer queue includes queue entries that are inserted into said sorted buffer queue based on an index value that is associated with each queue entry;
  removing queue entries from said sorted buffer queue only after information associated with said queue entries is stored in nonvolatile memory; and
  repeatedly updating the checkpoint value to equal the index value that is currently associated with the queue entry at the head of the sorted buffer queue.

52. The method of claim 50, further comprising performing the following steps after the failure:
  identifying a record that is associated with the checkpoint value;
  if a particular record was stored to nonvolatile memory before the record associated with the checkpoint value, then not processing the particular record; and
  if a particular record was not stored to nonvolatile memory before the record associated with the checkpoint value, then processing the particular record.

53. The method of claim 50, wherein the step of inserting the queue entries into said sorted buffer queue further comprises the step of adding the queue entries to the sorted buffer queue only if the queue entries do not already reside in the sorted buffer queue.

54. The method of claim 52, wherein the step of processing the particular record if the particular record was not stored to nonvolatile memory before the record associated with the checkpoint value further comprises the step of processing all records sequentially stored at locations that follow a location at which the record associated with the checkpoint value is stored.

55. The method of claim 54, further comprising the step of processing the record associated with the checkpoint value.

56. The method of claim 50, wherein the step of repeatedly updating the checkpoint value further comprises the step of writing to nonvolatile memory the checkpoint value at predetermined time intervals.

57. The method of claim 50, wherein the step of removing the queue entries from the sorted buffer queue further comprises the step of removing a particular number of queue entries, wherein the particular number of queue entries that are removed dynamically adjusts according to how many of the queue entries currently reside in the sorted buffer queue.

58. The method of claim 50, wherein the step of removing the queue entries from the sorted buffer queue further comprises the step of removing a particular number of queue entries, wherein the step of removing the particular number of queue entries is performed at a frequency that dynamically adjusts according to how many queue entries currently reside in the sorted buffer queue.

59. The method of claim 50, wherein the step of removing the queue entries from the sorted buffer queue further comprises the step of removing the queue entries from a position in said sorted buffer queue other than the head of the sorted buffer queue.

60. The method of claim 50, wherein the step of removing the queue entries from the sorted buffer queue further comprises the steps of:
  determining if the queue entries were updated while being removed from the sorted buffer queue;
  if the queue entries were updated while being removed from the sorted buffer queue, then inserting the updated queue entries back into the sorted buffer queue.

61. The method of claim 50, wherein the step of inserting the queue entries into said sorted buffer queue further comprises the step of adding the queue entries to the tail of the sorted buffer queue.

62. The method of claim 50, wherein the step of inserting the queue entries into said sorted buffer queue further comprises the step of adding the queue entries in a position other than the tail of the sorted buffer queue.

63. The method of claim 50, wherein the step of removing queue entries from the sorted buffer queue further comprises the step of removing queue entries from a position in said sorted buffer queue without removing the queue entries currently at the head of the sorted buffer queue.

64. The computer-readable medium of claim 51, further comprising instructions for performing the following steps after the failure:
identifying a record that is associated with the checkpoint value;
if a particular record was stored to nonvolatile memory before the record associated with the checkpoint value, then not processing the particular record; and
if the particular record was not stored to nonvolatile memory before the record associated with the checkpoint value, then processing the particular record.

65. The computer-readable medium of claim 51, wherein the step of inserting the queue entries into said sorted buffer queue further comprises the step of adding the queue entries to the sorted buffer queue only if the queue entries do not already reside in the sorted buffer queue.

66. The computer-readable medium of claim 64, wherein the step of processing the particular record if the particular record was not stored to nonvolatile memory before the record associated with the checkpoint value further comprises the step of processing all records sequentially stored at locations that follow a location at which the record associated with the checkpoint value is stored.

67. The computer-readable medium of claim 66, further comprising instruction for performing the step of processing the record associated with the checkpoint value.

68. The computer-readable medium of claim 51, wherein the step of repeatedly updating the checkpoint value further comprises the step of writing to nonvolatile memory the checkpoint value at predetermined time intervals.

69. The computer-readable medium of claim 51, wherein the step of removing the queue entries from the sorted buffer queue further comprises the step of removing a particular number of queue entries, wherein the particular number of queue entries that are removed dynamically adjusts according to how many of the queue entries currently reside in the sorted buffer queue.

70. The computer-readable medium of claim 51, wherein the step of removing the queue entries from the sorted buffer queue further comprises the step of removing a particular number of queue entries, wherein the step of removing the particular number of queue entries is performed at a frequency that dynamically adjusts according to how many queue entries currently reside in the sorted buffer queue.

71. The computer-readable medium of claim 51, wherein the step of removing the queue entries from the sorted buffer queue further comprises the step of removing the queue entries from a position in said sorted buffer queue other than the head of the sorted buffer queue.

72. The computer-readable medium of claim 51, wherein the step of removing the queue entries from the sorted buffer queue further comprises the steps of:
determining if the queue entries were updated while being removed from the sorted buffer queue;
if the queue entries were updated while being removed from the sorted buffer queue, then inserting the updated queue entries back into the sorted buffer queue.

73. The computer-readable medium of claim 51, wherein the step of inserting the queue entries into said sorted buffer queue further comprises the step of adding the queue entries to the tail of the sorted buffer queue.

74. The computer-readable medium of claim 51, wherein the step of inserting the queue entries into said sorted buffer queue further comprises the step of adding the queue entries in a position other than the tail of the sorted buffer queue.

75. The computer-readable medium of claim 51, wherein the step of removing queue entries from the sorted buffer queue further comprises the step of removing queue entries from a position in said sorted buffer queue without removing the queue entries currently at the head of the sorted buffer queue.

* * * * *